E. F. CURTIS.
FLEXIBLE SHAFT.
APPLICATION FILED APR. 23, 1908.
906,113.
Patented Dec. 8, 1908.
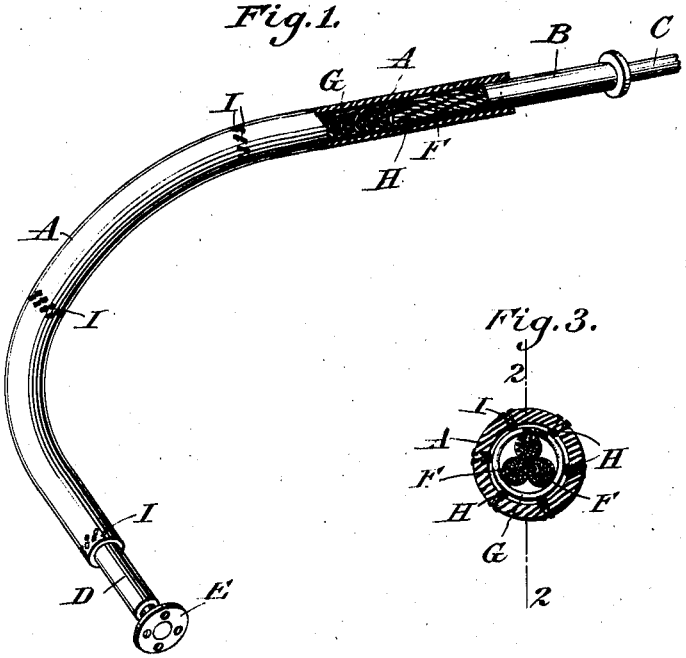
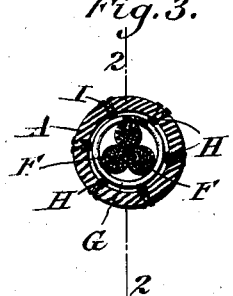
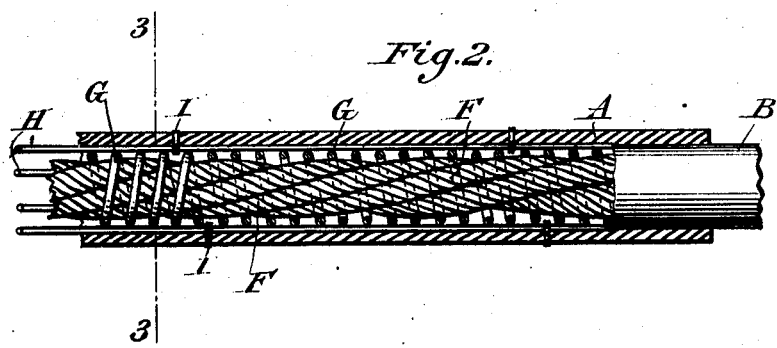
Witnesses:
Lemuel Patterson
D. V. R. Stillman
Edwin F. Curtis
Inventor:
Walter M. Reynolds
his Attorney

UNITED STATES PATENT OFFICE.

EDWIN FORREST CURTIS, OF OLEAN, NEW YORK.

FLEXIBLE SHAFT.

No. 906,113.  Specification of Letters Patent.  Patented Dec. 8, 1908.

Application filed April 23, 1908. Serial No. 428,851.

*To all whom it may concern:*

Be it known that I, EDWIN FORREST CURTIS, a citizen of the United States, residing at Olean, Cattaraugus county, New York, have invented certain new and useful Improvements in Flexible Shafts, of which the following is a specification, reference being had to the accompanying drawings.

My invention relates to the mechanism for transmitting power and motion; and it consists in the novel construction and combination of parts hereinafter fully described and claimed.

More particularly, this invention has reference to the means of transmitting motion and power from any suitable driving shaft or apparatus which may be operated by any suitable motive power, to a movable object such as a tool or other appliance or to machinery, so that the same can be operated by power while its position is varied; or used in any desired position, within its reach.

The object of my invention is to provide an improved core or shaft by combining a number of small steel wires, or any elastic material, into strands and intertwining or interlacing or plaiting two or more of these strands into a flexible core or shaft of such a character that in revolving the different wires, or other elastic material, may change its position but not the molecules of any one wire.

Another object of this invention is to provide an improved outer covering or casing for the said core or shaft by stiffening any flexible material with steel wires, or any elastic material, placed at suitable and convenient distances and in sufficient numbers, run longitudinally the whole length of said covering or casing in the manner hereinafter fully described. And a further object of this invention is to provide one or both of said parts of this construction so that they can be produced at comparatively small cost, separately or in combination.

With the above and other objects in view, this invention consists in the novel features and the combination and especially the arrangement, of parts hereinafter described and claimed, and illustrated in the accompanying drawings in which—

Figure 1. is a perspective view of the flexible core or shaft and its appurtenances bent at a right angle, embodying my invention, with a portion of the flexible cover removed. Fig. 2. is a section of the shaft detached, and Fig. 3. represents a traverse section of the flexible wire, or other elastic material, shaft and its improved casing.

In the drawings, A is the casing for my improved flexible core or shaft, the body of which is supported by a resilient element G., covered with leather or other flexible material, which is stiffened by a sufficient number of small steel wires, or the like, H., placed longitudinally the whole length of said casing A and securely fastened to it (A) by means of small staples I.

C and E represent any suitable driving shaft or bearing device but forms no part of this invention.

B and D denote the substantially round, rigid driving collar or journal bearing formed by means of the ends of said core or shaft F, being securely fastened with solder, or other suitable material or compound and to which any suitable driving shaft or bearing device, C and E, may be attached. And F denotes my improved shaft or core, as clearly shown in Figs. 1, 2 and 3, composed of two or more strands but preferably of three strands as shown, each of these strands being composed of a suitable number of any flexible material, preferably of steel wires, which insures its strength and elasticity. The said wires being twisted, laced or plaited but not wrapped together in variable numbers all sizes of cores or shafts may be made (for light or heavy work) and the three strands, composing the said core or shaft F, being twisted, laced or plaited but not wrapped, with their ends securely fastened, allows the said shaft or core to be revolved, forward or backward, at any desired speed.

While I have shown and described the preferred embodiment of my invention it will be understood that I do not limit myself to the precise showing herein set forth, since various changes in the form, proportion and minor details may be resorted to without departing from the spirit or sacrificing any of the advantages of my invention.

Having thus described my invention, what I claim is:

1. The stiffened casing or covering herein described, composed of any suitable flexible material, with a sufficient number of steel wires, securely fastened to it, extending longitudinally the whole length of the casing, said casing or covering being supported by a resilient element, preferably a coiled spring.

2. As an article of manufacture, a flexible shaft consisting of two or more strands, each strand composed of any desired number of steel wires, twisted together, securely fastened at both ends for the transmission of power, when revolved; and the shaft or core being incased in a stiffened casing or covering, composed of any suitable flexible material, with a sufficient number of steel wires, securely fastened to it, extending longitudinally the whole length of the casing, said casing or covering being supported by a resilient element, preferably a coiled spring.

3. As an article of manufacture, the combination of a flexible shaft, consisting of three strands, composed of any desired number of steel wires, twisted together and securely fastened at both ends for the transmission of power, when revolved; and a flexible casing, composed of a flexible outer covering, stiffened with steel wires, securely fastened to and extending longitudinally the whole length of it, said covering being supported by a resilient element, preferably a coiled spring.

In testimony whereof I hereunto affix my signature in the presence of two witnesses.

EDWIN FORREST CURTIS.

Witnesses:
 E. A. JUDD,
 EDGAR A. SMITH.